US012552638B2

(12) United States Patent
Koba

(10) Patent No.: US 12,552,638 B2
(45) Date of Patent: Feb. 17, 2026

(54) ELEVATING BODY DERAILMENT DETECTION DEVICE

(71) Applicant: Mitsubishi Electric Corporation, Tokyo (JP)

(72) Inventor: Yoshimasa Koba, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 798 days.

(21) Appl. No.: 17/964,969

(22) Filed: Oct. 13, 2022

(65) Prior Publication Data

US 2023/0406672 A1 Dec. 21, 2023

(30) Foreign Application Priority Data

Jun. 17, 2022 (JP) ................................ 2022-097964

(51) Int. Cl.
*B66B 5/02* (2006.01)
*B66B 1/34* (2006.01)
(Continued)

(52) U.S. Cl.
CPC .............. *B66B 5/02* (2013.01); *B66B 1/3453* (2013.01); *B66B 1/46* (2013.01); *B66B 5/0031* (2013.01); *B66B 11/0005* (2013.01)

(58) Field of Classification Search
CPC ....... B66B 1/34; B66B 1/3415; B66B 1/3423; B66B 1/3446; B66B 1/3453;
(Continued)

(56) References Cited

U.S. PATENT DOCUMENTS 9,033,113 B2 * 5/2015 Winey .................... B66B 5/022 187/391
9,580,275 B2 * 2/2017 Moser ..................... B66B 15/02
(Continued)

FOREIGN PATENT DOCUMENTS

JP S50-21264 U 3/1975
JP 9-255252 A 9/1997
(Continued)

OTHER PUBLICATIONS

Office Action issued Dec. 2, 2025 in Japanese Patent Application No. 2022-097964, 5 pages.

*Primary Examiner* — Christopher Uhlir
(74) *Attorney, Agent, or Firm* — XSENSUS LLP

(57) ABSTRACT

An elevating body derailment detection device includes a wire, a suspension member, a detection circuit, an arm, and a detection unit. The wire is arranged in parallel with an elevating direction. The suspension member is provided at one end of the wire, and is provided with the first conductive part. The detection circuit includes second conductive parts to be electrically connected to the first conductive part. In the detection circuit, a current flows via the first conductive part. The arm is provided to an elevating body, and has a hollow portion through which the wire is to be passed in parallel with the elevating direction. When the elevating body is disengaged from the guide rail, the hollow portion contacts the wire to move the suspension member so that the first conductive part is electrically disconnected from the second conductive parts, and then the detection unit detects a derailment.

5 Claims, 8 Drawing Sheets

(51) Int. Cl.
*B66B 1/46* (2006.01)
*B66B 5/00* (2006.01)
*B66B 11/00* (2006.01)

(58) Field of Classification Search
CPC ......... B66B 1/3492; B66B 1/46; B66B 1/461; B66B 1/50; B66B 5/00; B66B 5/0006; B66B 5/0018; B66B 5/0031; B66B 5/02; B66B 7/12–1223; B66B 7/1246; B66B 11/0005; B66B 11/02; B66B 11/0206; B66B 11/0226
See application file for complete search history.

(56) References Cited

U.S. PATENT DOCUMENTS 12,264,042 B2 * 4/2025 Koide .............. G01R 19/16571
2012/0024636 A1 * 2/2012 Niikawa ................... B66B 5/02 187/391
2019/0084805 A1 * 3/2019 Koide ................... B66B 5/0031
2019/0119069 A1 * 4/2019 Koide ....................... B66B 1/48
2020/0048038 A1 * 2/2020 Koide .................... H01H 35/02
2021/0130128 A1 * 5/2021 Miyazaki ............. B66B 5/0031

FOREIGN PATENT DOCUMENTS

JP 2003-321169 A 11/2003
WO 2011/010376 A1 1/2011
WO 2018/198243 A1 11/2018

* cited by examiner

ELEVATING BODY DERAILMENT DETECTION DEVICE

CROSS-REFERENCE TO RELATED APPLICATIONS

The present application claims priority under 35 U.S.C. § 119 to Japanese Patent Application No. 2022-097964, filed on Jun. 17, 2022, the contents of which application are incorporated herein by reference in their entirety.

TECHNICAL FIELD

The present disclosure relates to an elevating body derailment detection device.

BACKGROUND

A conventional elevating body derailment detection device includes first and second electrical wires arranged in parallel with an elevating direction of an elevating body substantially over the entire length of a hoistway, first and second contacts mounted on the elevating body, and a detection unit configured to detect that the elevating body is disengaged from a guide rail. The first electrical wire is set at a positive potential, and the second electrical wire is set at a ground potential. If the elevating body is disengaged from the guide rail, the first and second contacts mounted on the elevating body are brought into contact with the first and second electrical wires, thereby causing the first electrical wire to be electrically connected to the second electrical wire via the first and second contacts and a frame body of a counter weight. The detection unit detects that the elevating body is disengaged from the guide rail when the potential of the first electrical wire is equivalent to that of the second electrical wire (for example, see WO 2011/010376 A1).

In the above-described conventional elevating body derailment detection device, the first and second electrical wires are arranged substantially over the entire length of the hoistway. Accordingly, it is necessary for a maintenance person to carefully perform work so as not to contact the first and second electrical wires while performing work in the hoistway, which leads to a decrease in work efficiency of the maintenance person.

SUMMARY

The present disclosure has been made in order to solve the above-described problem, and has an object to provide an elevating body derailment detection device which makes it possible to suppress a decrease in work efficiency of a maintenance person.

The features and advantages of the present disclosure may be summarized as follows.

According to an elevating body derailment detection device includes: a wire that is arranged in parallel with an elevating direction of an elevating body that is raised and lowered along a guide rail provided in a hoistway; a suspension member that is provided at one end of the wire and is provided with a first conductive part; a detection circuit that has second conductive parts to be electrically connected to the first conductive part, and in which a current flows via the first conductive part; an arm that is provided to the elevating body, and has a hollow portion through which the wire is to be passed in parallel with the elevating direction, wherein when the elevating body is disengaged from the guide rail, the hollow portion is brought into contact with the wire to move the suspension member so that the first conductive part is electrically disconnected from the second conductive parts; and a detection unit that detects that the elevating body is disengaged from the guide rail, when the first conductive part is electrically disconnected from the second conductive parts.

Other and further objects, features and advantages of the disclosure will appear more fully from the following description.

DESCRIPTION OF EMBODIMENTS

First Embodiment

Hereinafter, an elevator device including an elevating body derailment detection device according to a first embodiment will be described in detail. Note that the same reference symbols in each drawing indicate the same or equivalent components.

Figure 1:
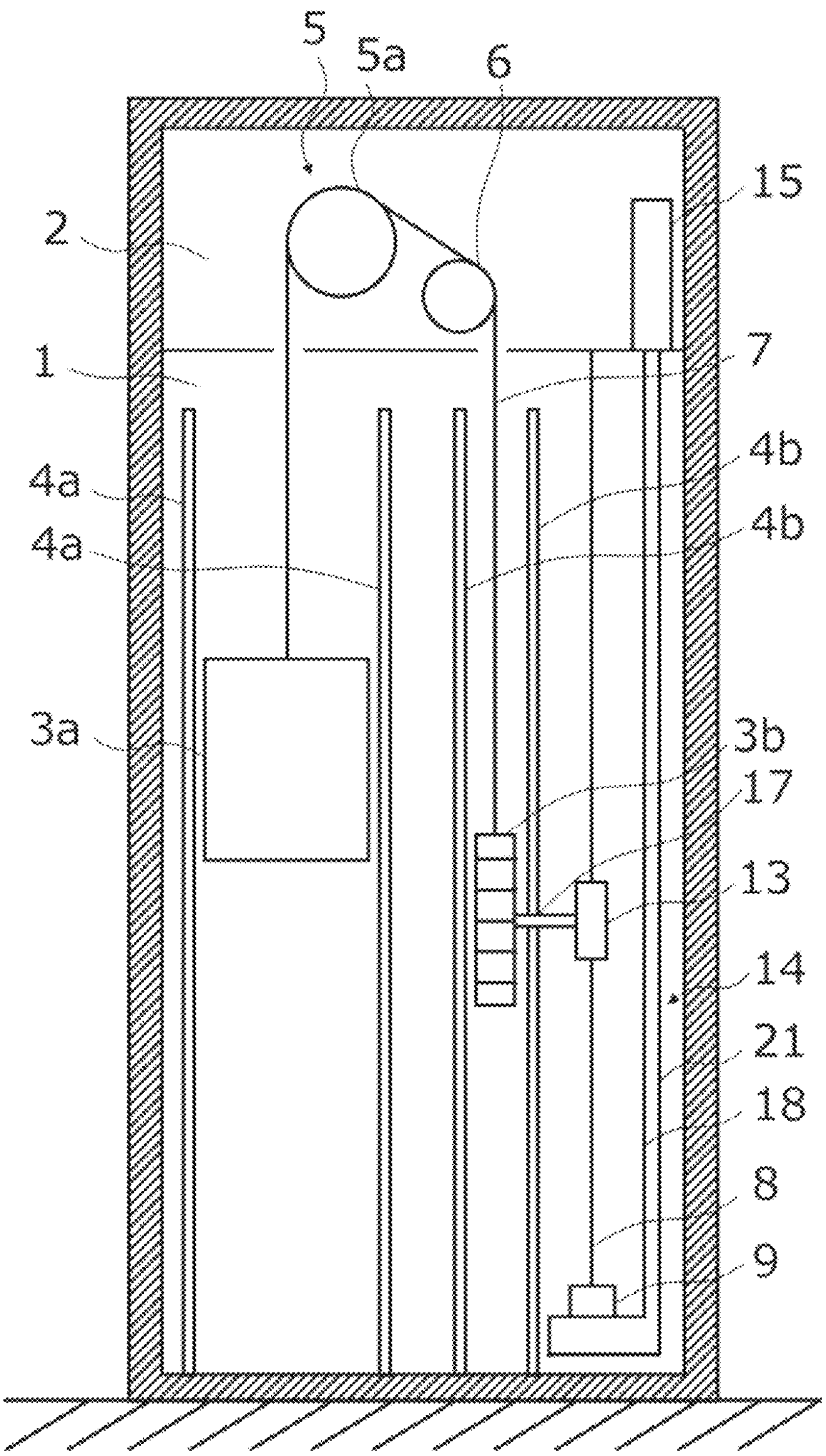
FIG. 1 is a configuration diagram of an elevator device including an elevating body derailment detection device according to a first embodiment.

As illustrated in FIG. 1, the elevator device includes an elevating body, guide rails, a traction machine 5, a deflector sheave 6, a suspension body 7, and the elevating body derailment detection device. As illustrated in FIG. 1, a machine room 2 is provided in an upper portion of a hoistway 1. In the hoistway 1, a car 3*a* and a counter weight 3*b* are provided, each of which is the elevating body. In the following description, the car 3*a* and the counter weight 3*b* are each referred to as an elevating body 3 when these are described without being distinguished from each other. In the hoistway 1, car guide rails 4*a* and counter weight guide rails 4*b* are provided, which are the guide rails. In the following description, the car guide rails 4*a* and the counter weight guide rails 4*b* are each referred to as guide rails 4 when these are described without being distinguished from each other. The car 3*a* is raised and lowered along the car guide rails 4*a* in the hoistway 1. The counter weight 3*b* is raised and lowered along the counter weight guide rails 4*b* in the hoistway 1.

In the machine room 2, the traction machine 5 and the deflector sheave 6 are provided. The traction machine 5 includes a drive sheave 5*a* and a motor (not illustrated), and the motor is configured to rotate the drive sheave 5*a*. The suspension body 7 is wound around the drive sheave 5*a* and the deflector sheave 6. The car 3*a* is connected to one end of the suspension body 7, and the counter weight 3*b* is connected to the other end of the suspension body 7. The elevating body 3 is raised and lowered in the hoistway 1 by rotating the drive sheave Sa.

The elevating body derailment detection device includes a wire 8, a suspension member 9, a pair of valves 10, springs 11, a switch 12, an arm 13, a detection circuit 14, and a control device 15. As illustrated in FIG. 1, the wire 8 is provided in the hoistway 1, and is arranged in parallel with an elevating direction of the elevating body 3 which is a vertical direction. One end of the wire 8 is provided with the suspension member 9. The other end of the wire 8 is fixed to a ceiling of the hoistway 1.

Figure 2:
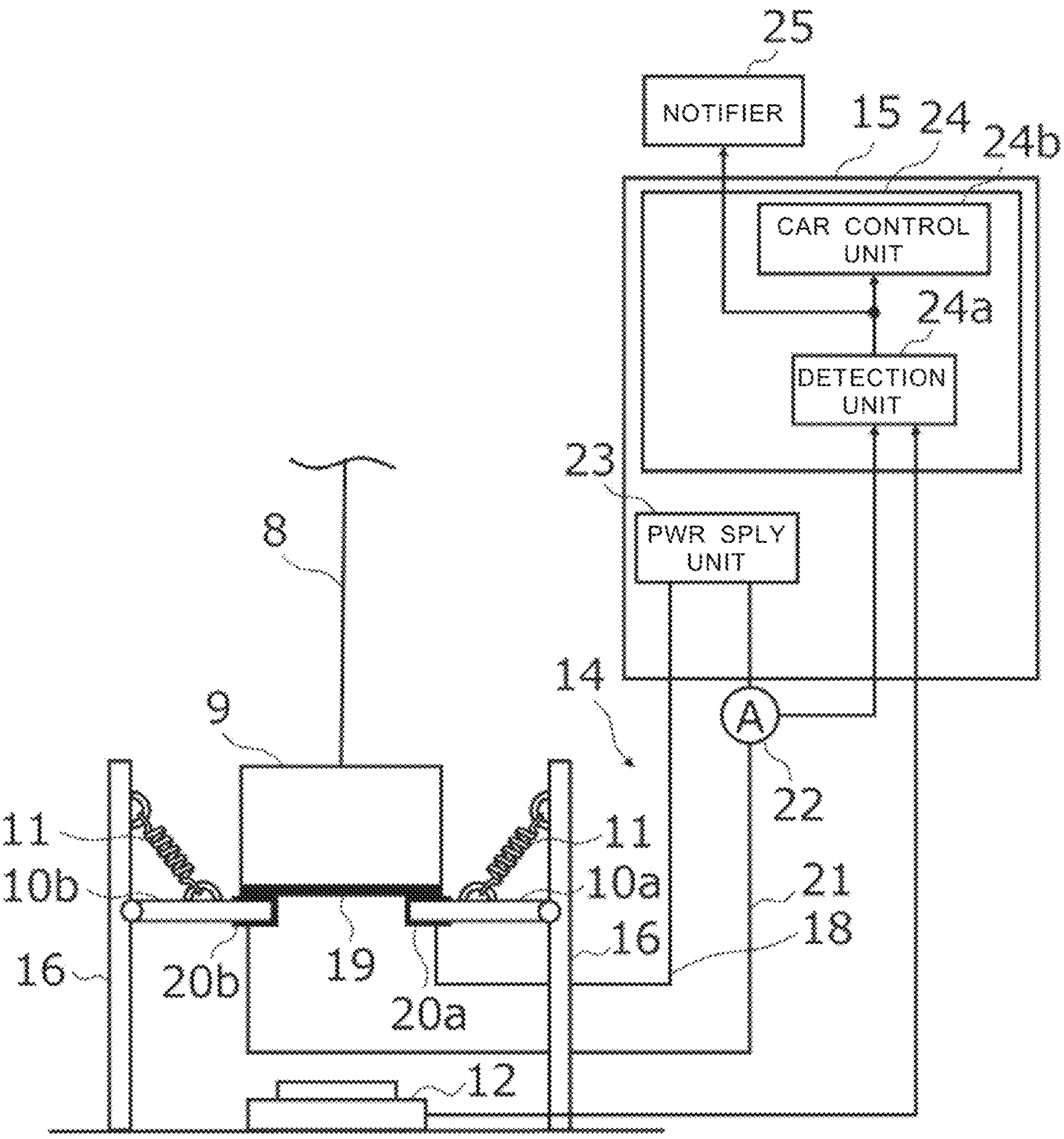
FIG. 2 is a configuration diagram of the elevating body derailment detection device according to the first embodiment.

The suspension member 9 is provided at one end of the wire 8. The suspension member 9 is formed of an insulator such as rubber to have a rectangular parallelepiped shape, and one end of the wire 8 is attached to an upper surface of the suspension member 9. As illustrated in FIG. 2, a first conductive part 19 of the detection circuit 14, which will be described later, is provided on the suspension member 9.

Figure 3:
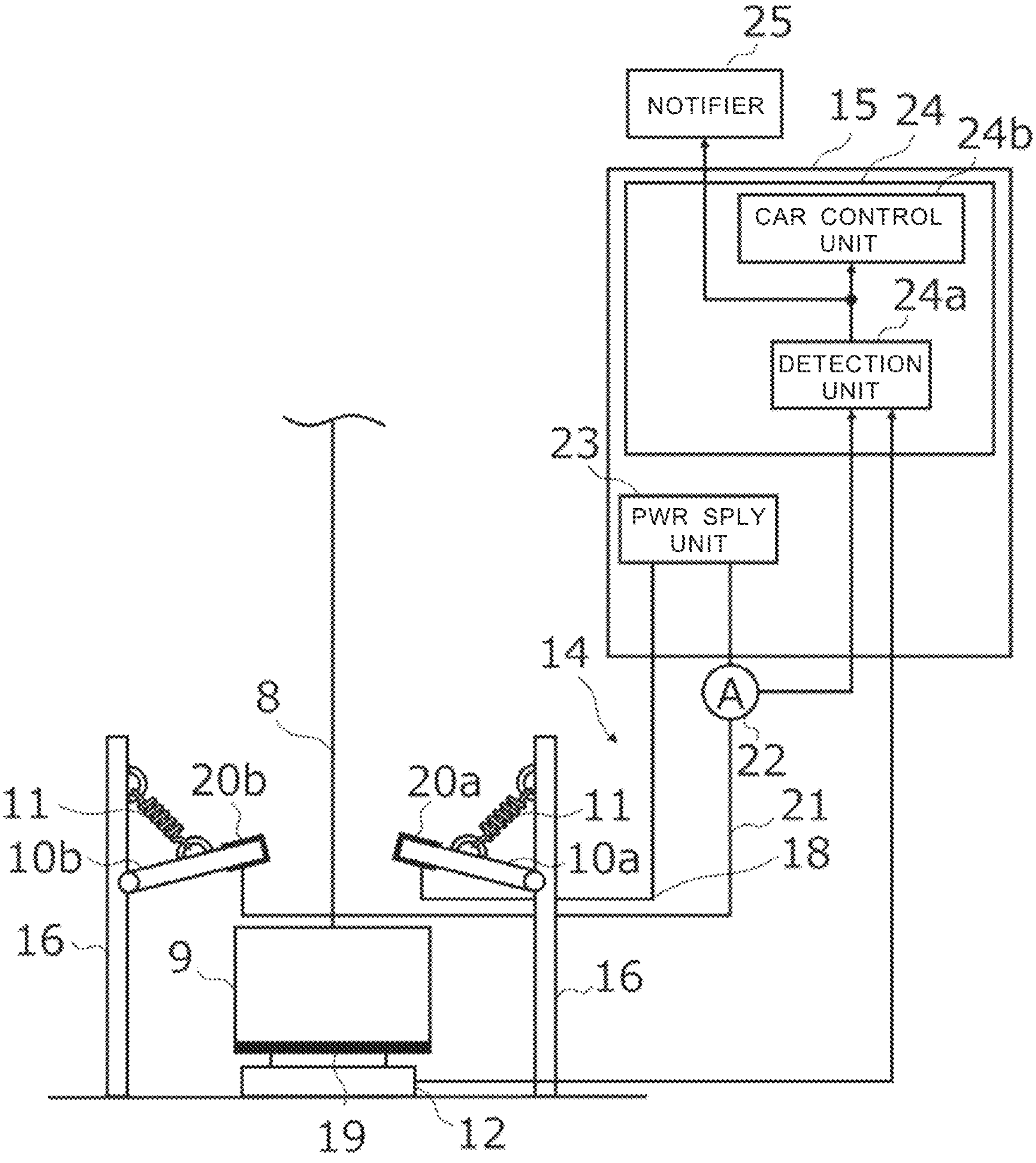
FIG. 3 is a configuration diagram of the elevating body derailment detection device according to the first embodiment when there has occurred breakage in the wire.

As illustrated in FIG. 2, the pair of valves 10 include one valve 10*a* and the other valve 10*b*, and are arranged so that one valve 10*a* and the other valve 10*b* face each other. The pair of valves 10 are each formed of an insulator such as rubber to have a plate shape. The pair of valves 10 each have one end turnably attached to a column part 16. The pair of valves 10 each have the other end provided with the corresponding one of a pair of second conductive parts 20, which will be described later. The pair of valves 10 are configured to support the suspension member 9 when there is no breakage in the wire 8, and to be turned and opened by the weight of the suspension member 9 when there has occurred breakage in the wire 8. When the pair of valves 10 are thus opened, the suspension member 9 drops from the pair of valves 10 as illustrated in FIG. 3.

As illustrated in FIG. 2, the springs 11 which are elastic members urge the pair of valves 10 so that the pair of second conductive parts 20, which will be described later, provided on the pair of valves 10 contact the first conductive part 19, which will be described later, provided on the suspension member 9. The springs 11 each have one end fixed to the corresponding one of the pair of valves 10, and each have the other end fixed to the column part 16.

The switch 12 which is a sensor detects that the suspension member 9 has dropped. As illustrated in FIG. 3, the switch 12 is provided on a floor of the hoistway 1 to be pressed by the suspension member 9 when there occurs breakage in the wire 8 and then the suspension member 9 drops from the pair of valves 10. In other words, the switch 12 is provided on the floor of the hoistway 1 to face a lower surface of the suspension member 9. The switch 12 detects that the suspension member 9 has dropped when being pressed by the suspension member 9. When being pressed by the suspension member 9, the switch 12 outputs a drop detection signal which is an electrical signal indicating that the switch 12 has detected the drop of the suspension member 9, to a detection unit 24*a*, which will be described later, via an input/output interface (not illustrated).

Figure 4:
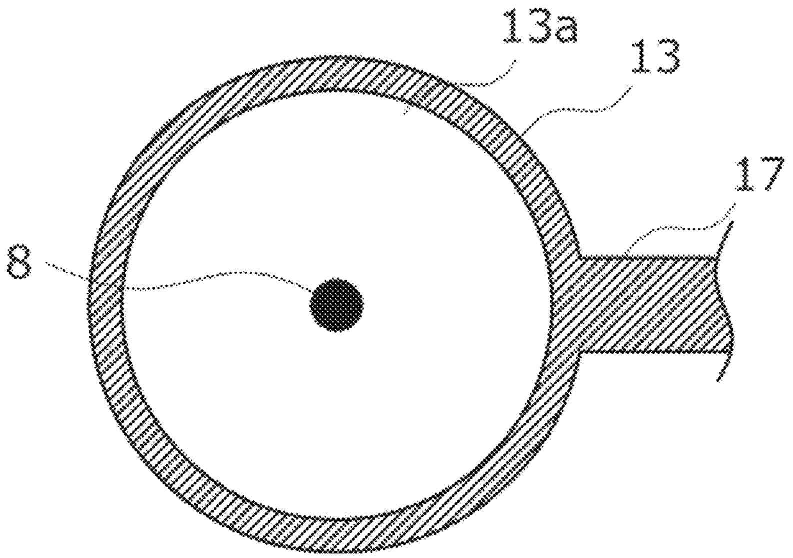
FIG. 4 is a cross-sectional view of the arm of the elevating body derailment detection device according to the first embodiment.

FIG. 4 illustrates a cross-sectional view of the arm 13. As illustrated in FIGS. 1 and 4, the arm 13 is formed into a cylindrical shape having a hollow portion 13*a*, and is provided to the counter weight 3*b* via a support member 17. Accordingly, the arm 13 is raised and lowered in the hoistway 1 as the counter weight 3*b* is raised and lowered.

Note that the wire 8 extends continuously from an upper end to a lower end of a movable range of the arm 13, which makes it possible for the arm 13 to be raised and lowered without being interfered by the wire 8.

Figure 5:
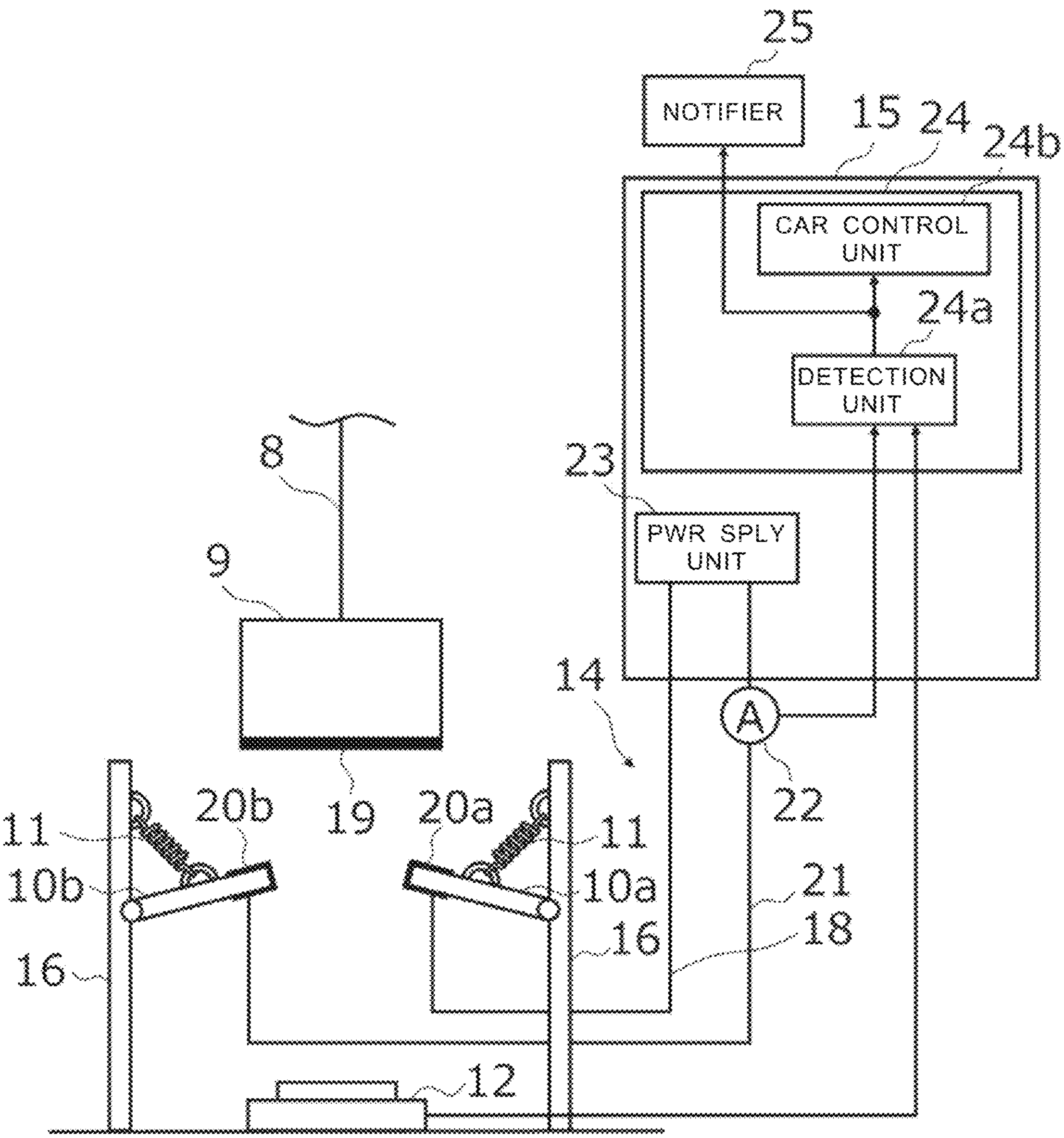
FIG. 5 is a configuration diagram of the elevating body derailment detection device according to Embodiment 1 when the elevating body is disengaged from the guide rail.

As illustrated in FIG. 4, the arm 13 has an annular hollow portion 13*a* through which the wire 8 is to be passed in parallel with the elevating direction of the elevating body 3. When the counter weight 3*b* is raised or lowered along the counter weight guide rails 4*b* or the counter weight 3*b* is not disengaged from the counter weight guide rails 4*b*, the wire 8 and the hollow portion 13*a* are not in contact with each other. Meanwhile, when the counter weight 3*b* is disengaged from the counter weight guide rails 4*b*, the hollow portion 13*a* is brought into contact with the wire 8, whereby the wire 8 is pulled. When the wire 8 is pulled, the suspension member 9 provided at one end of the wire 8 is moved upward as illustrated in FIG. 5.

As illustrated in FIG. 2, the detection circuit 14 includes a first electrical wire 18, the first conductive part 19, the pair of second conductive parts 20, and a second electrical wire 21. A current supplied from a power supply unit 23, which will be described later, flows into the first electrical wire 18. The first electrical wire 18 is electrically connected to one second conductive part 20*a*, which will be described later. In addition, the first electrical wire 18 is covered by coating of an insulator.

The first conductive part 19 is provided on the suspension member 9. The first conductive part 19 is formed of a conductor made of copper or the like to have a plate shape, and is fixed to the lower surface of the suspension member 9.

The pair of second conductive parts 20 include one second conductive part 20*a* and the other second conductive part 20*b*. The pair of second conductive parts 20 are formed of conductors made of copper or the like, and are provided on the pair of valves 10 to each cover a part of a surface on the other end side of the corresponding valve 10, the other end side not being attached to the column part 16. Specifically, the pair of second conductive parts 20 are each formed along an upper surface, a side surface, and a lower surface on the other end side of the corresponding one of the pair of valves 10 to have a U shape, and are each provided on the other end side of the corresponding one of the pair of valves 10. When contacting the first conductive part 19 on the suspension member 9, the pair of second conductive parts 20 are electrically connected to the first conductive part 19.

The second electrical wire 21 is electrically connected to the other second conductive part 20*b*. The second electrical wire 21 is electrically connected to the first electrical wire 18 via the first conductive part 19 and the pair of second conductive parts 20. Therefore, the current supplied to the first electrical wire 18 flows into the second electrical wire 21 via the first conductive part 19 and the pair of second conductive parts 20. In other words, the current flows in the detection circuit 14 via the first conductive part 19 and the pair of second conductive parts 20. In addition, the second electrical wire 21 is covered by coating of an insulator.

The detection circuit 14 is provided with an ammeter 22 that measures a current flowing in the second electrical wire 21. When a current value is zero amperes, the ammeter 22 outputs a current non-detection signal which is an electrical signal indicating that the current flowing in the second electrical wire 21 is not detected, to the detection unit 24*a*, which will be described later, via the input/output interface (not illustrated).

As illustrated in FIG. 1, the control device 15 is provided in the machine room 2. As illustrated in FIG. 2, the control device 15 includes the power supply unit 23 and a control unit 24. The power supply unit 23 is a battery for supplying a current to the first electrical wire 18.

The control unit 24 is a device such as a control circuit board comprising a processor including an integrated circuit of a semiconductor, a memory, and an input/output interface, and is configured to control the entire elevator device. The control unit 24 includes the detection unit 24*a* and a car control unit 24*b*.

The detection unit 24*a* includes a software module that detects that the counter weight 3*b* is disengaged from the counter weight guide rails 4*b* or that there has occurred breakage in the wire 8, on the basis of the current non-detection signal obtained from the ammeter 22 and the drop detection signal obtained from the switch 12. The detection unit 24*a* includes a software module that outputs an operation pause control command to the car control unit 24*b* on the basis of the above-described detection. The detection unit 24*a* further includes a software module that outputs a derailment detection signal or a wire breakage detection signal to a notifier 25, which will be described later, on the basis of the above-described detection. The derailment detection signal refers to an electrical signal indicating that the derailment of the counter weight 3*b* has been detected. The wire breakage detection signal refers to an electrical signal indicating that the breakage in the wire 8 has been detected.

The car control unit 24*b* includes a software module that controls an operation of the elevating body 3 by controlling the traction machine 5.

The notifier 25 is a device that notifies a maintenance person of the elevator device. Examples of the notifier 25 include an information terminal of a management company that manages the elevator device, an information center of an elevator device maintenance company, and a mobile information terminal owned by a maintenance person that executes maintenance of the elevator device.

Figure 6:
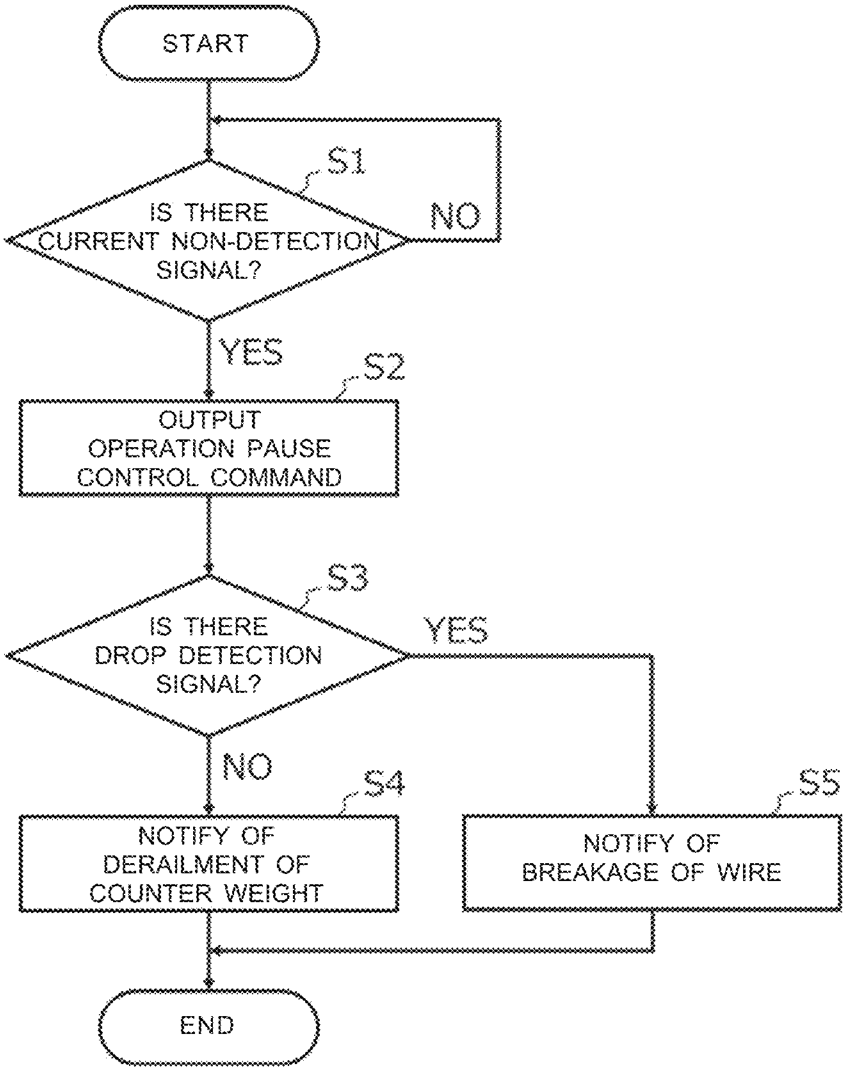
FIG. 6 is a flowchart illustrating control in the control unit of the elevating body derailment detection device according to the first embodiment.

Next, the operation of the present embodiment will be described. FIG. 6 is a flowchart illustrating control in the control unit 24 of the control device 15.

In step S1, the detection unit 24*a* detects that the counter weight 3*b* is disengaged from the counter weight guide rails 4*b* or that there has occurred breakage in the wire 8 on the basis of the current non-detection signal obtained from the ammeter 22. Specifically, the detection unit 24*a* determines whether the current non-detection signal output from the ammeter 22 has been received. When the detection unit 24*a* has not received the current non-detection signal, step S1 is repeated. The detection unit 24*a* detects that the counter weight 3*b* is disengaged from the counter weight guide rails 4*b* or that there has occurred breakage in the wire 8, when having received the current non-detection signal, and the process proceeds to step S2.

Here, the ammeter 22 outputs the current non-detection signal in the following two cases. A first case is when the counter weight 3*b* is disengaged from the counter weight guide rails 4*b*. Specifically, when the counter weight 3*b* is disengaged from the counter weight guide rails 4*b*, the hollow portion 13*a* of the arm 13 pulls the wire 8, whereby the suspension member 9 provided at one end of the wire 8 is moved upward as illustrated in FIG. 5. When the suspension member 9 is moved, the first conductive part 19 is electrically disconnected from the pair of second conductive parts 20 in the detection circuit 14, whereby a current does not flow into the second electrical wire 21. At this time, the current value measured by the ammeter 22 becomes zero amperes, and then the ammeter 22 outputs the current non-detection signal.

A second case is when there has occurred breakage in the wire 8. Specifically, when there has occurred breakage in the wire 8, the suspension member 9 drops from the pair of valves 10 as illustrated in FIG. 3. When the suspension member 9 drops, the first conductive part 19 is electrically disconnected from the pair of second conductive parts 20 in the detection circuit 14, whereby a current does not flow into the second electrical wire 21. At this time, the current value measured by the ammeter 22 becomes zero amperes, and then the ammeter 22 outputs the current non-detection signal.

Accordingly, in step S1, the detection unit 24*a* receives the current non-detection signal from the ammeter 22 when the first conductive part 19 is electrically disconnected from the pair of second conductive parts 20, whereby the detection unit 24*a* can detect that the counter weight 3*b* is disengaged from the counter weight guide rails 4*b* or that there has occurred breakage in the wire 8.

In step S2, when detecting that the counter weight 3*b* is disengaged from the counter weight guide rails 4*b* or that there has occurred breakage in the wire 8, the detection unit 24*a* outputs the operation pause control command to the car control unit 24*b*. When the detection unit 24*a* outputs the operation pause control command to the car control unit 24*b*, the car control unit 24*b* controls the traction machine 5 so that the operation of the elevating body 3 pauses.

In step S3, the detection unit 24*a* detects that the counter weight 3*b* is disengaged from the counter weight guide rails 4*b* or that there has occurred breakage in the wire 8, on the basis of the drop detection signal obtained from the switch 12. Specifically, the detection unit 24*a* determines whether the drop detection signal output from the switch 12 has been received. The switch 12 outputs the drop detection signal when there has occurred breakage in the wire 8. That is, the switch 12 is pressed by the suspension member 9 when there occurs breakage in the wire 8 and then the suspension member 9 drops from the pair of valves 10, and outputs the drop detection signal. Accordingly, the detection unit 24*a* detects that there has occurred breakage in the wire 8 when having received the drop detection signal, and the process proceeds to step S5. Meanwhile, the detection unit 24*a* detects that the counter weight 3*b* is disengaged from the counter weight guide rails 4*b* when having not received the drop detection signal, and the process proceeds to step S4.

In step S4, when detecting that the counter weight 3*b* is disengaged from the counter weight guide rails 4*b*, the detection unit 24*a* outputs the derailment detection signal to the notifier 25. Then, the control unit 24 ends the processing. In step S5, when detecting that there has occurred breakage in the wire 8, the detection unit 24*a* outputs the wire breakage detection signal to the notifier 25. Then, the control unit 24 ends the processing.

As described above, in the elevating body derailment detection device according to the first embodiment, the wire 8 is pulled by the arm 13 when the counter weight 3*b* is disengaged from the counter weight guide rails 4*b*, and the suspension member 9 is moved upward, thereby causing the first conductive part 19 to be electrically disconnected from the pair of second conductive parts 20 in the detection circuit 14. The detection unit 24*a* detects that the counter weight 3*b* is disengaged from the counter weight guide rails 4*b*, when the first conductive part 19 is electrically disconnected from the pair of second conductive parts 20. This configuration eliminates the need to cause a current to flow in the wire 8 arranged in parallel with the elevating direction of the elevating body 3. Accordingly, it is unnecessary for a maintenance person to carefully perform work so as not to contact the wire 8 while performing work in the hoistway 1, which makes it possible to suppress a decrease in work efficiency of the maintenance person.

Furthermore, the elevating body derailment detection device according to the first embodiment includes the pair of valves 10 that are opened by the weight of the suspension member 9 when there has occurred breakage in the wire 8, thereby causing the first conductive part 19 to be electrically disconnected from the pair of second conductive parts 20. The detection unit 24*a* detects that the counter weight 3*b* is disengaged from the counter weight guide rails 4*b* or that there has occurred breakage in the wire 8, when the first conductive part 19 is electrically disconnected from the pair of second conductive parts 20. This makes it possible to detect the breakage of the wire 8 which is a failure of the elevating body derailment detection device.

Furthermore, the elevating body derailment detection device according to the first embodiment includes the switch 12 that detects that the suspension member 9 has dropped. The detection unit 24*a* detects that there has occurred breakage in the wire 8, when the first conductive part 19 is electrically disconnected from the pair of second conductive parts 20 and the switch 12 detects that the suspension member 9 has dropped. Furthermore, the detection unit 24*a* detects that the counter weight 3*b* is disengaged from the counter weight guide rails 4*b*, when the first conductive part 19 is electrically disconnected from the pair of second conductive parts 20 and the switch 12 does not detect that the suspension member 9 has dropped. Thus, the detection unit 24*a* determines and detects the derailment of the counter weight 3*b* or the breakage of the wire 8, whereby a maintenance person can prepare to perform the maintenance work according to the cause of the anomaly.

Furthermore, the elevating body derailment detection device according to the first embodiment includes the springs 11 that urge the pair of valves 10 so that the pair of second conductive parts 20 contact the first conductive part 19. When a building in which the elevator device is installed vibrates or the elevating body 3 is raised and lowered, the wire 8 and the suspension member 9 vibrate. When the wire 8 and the suspension member 9 vibrate, the first conductive part 19 provided on the suspension member 9 is temporarily brought into no contact with the pair of second conductive parts 20 provided to the pair of valves 10, which may cause the first conductive part 19 to be electrically disconnected from the pair of second conductive parts 20. In this way, in the case where the first conductive part 19 is electrically disconnected from the pair of second conductive parts 20 despite the fact that there does not occur the derailment of the counter weight 3*b* or the breakage of the wire 8, the detection unit 24*a* erroneously detects that there has occurred the derailment of the counter weight 3*b* or the breakage of the wire 8. However, when the springs 11 urge the pair of valves 10 so that the pair of second conductive parts 20 contact the first conductive part 19, the first conductive part 19 is prevented from being electrically disconnected from the pair of second conductive parts 20, which makes it possible to prevent the detection unit 24*a* from erroneously detecting that there has occurred the derailment of the counter weight 3*b* or the breakage of the wire 8.

There has been described an example in which the suspension member 9 and the pair of valves 10 each are formed of an insulator, but these may be each covered by a film of an insulator after formation. In this way, the suspension member 9 and the pair of valves 10 each have a surface formed of an insulator, and it is unnecessary for a maintenance worker to carefully perform work so as not to contact the suspension member 9 and the pair of valves 10 while performing work in the hoistway 1, which makes it possible to suppress a decrease in work efficiency of the maintenance person.

There has been described an example in which the arm 13 is provided to the counter weight 3*b* to detect that the counter weight 3*b* is disengaged from the counter weight guide rails 4, but the arm 13 may be provided to the car 3*a* to detect that the car 3*a* is disengaged from the car guide rails 4*a*.

There has been described an example in which the hollow portion 13*a* of the arm 13 is formed into an annular shape, but the shape of the hollow portion 13*a* may be formed into an elliptical annular shape, a polygonal annular shape or the like.

Note that the sensor may be other than the switch 12 as long as it can detect that the suspension member 9 has dropped, and the sensor may be, for example, a photoelectric sensor, an ultrasound sensor, or the like that is provided on the floor of the hoistway 1 to face the lower surface of the suspension member 9 and measures a distance to the suspension member 9.

Note that the pair of second conductive parts 20 may have any shape other than the U shape as long as the pair of second conductive parts 20 is able to be electrically connected to the first conductive part 19, and the shape may be, for example, a plate shape, an L shape, and the like.

There has been described an example in which the power supply unit 23 is a battery, but the power supply unit 23 may be an externally charged storage battery, a power supply circuit that converts an AC current supplied from a commercial power supply (not illustrated) to a DC current or converts a voltage, or the like.

Second Embodiment

In the first embodiment, there has been described the elevating body derailment detection device including the switch 12 that detects that the suspension member 9 has dropped. In a second embodiment, there is described an elevating body derailment detection device in which the switch 12 is not provided. Specifically, the second embodiment is different from the first embodiment in which the detection unit 24*a* does not determine and detect the derailment of the counter weight 3*b* or the breakage of the wire 8, and therefore the difference will be described as follows.

Figure 7:
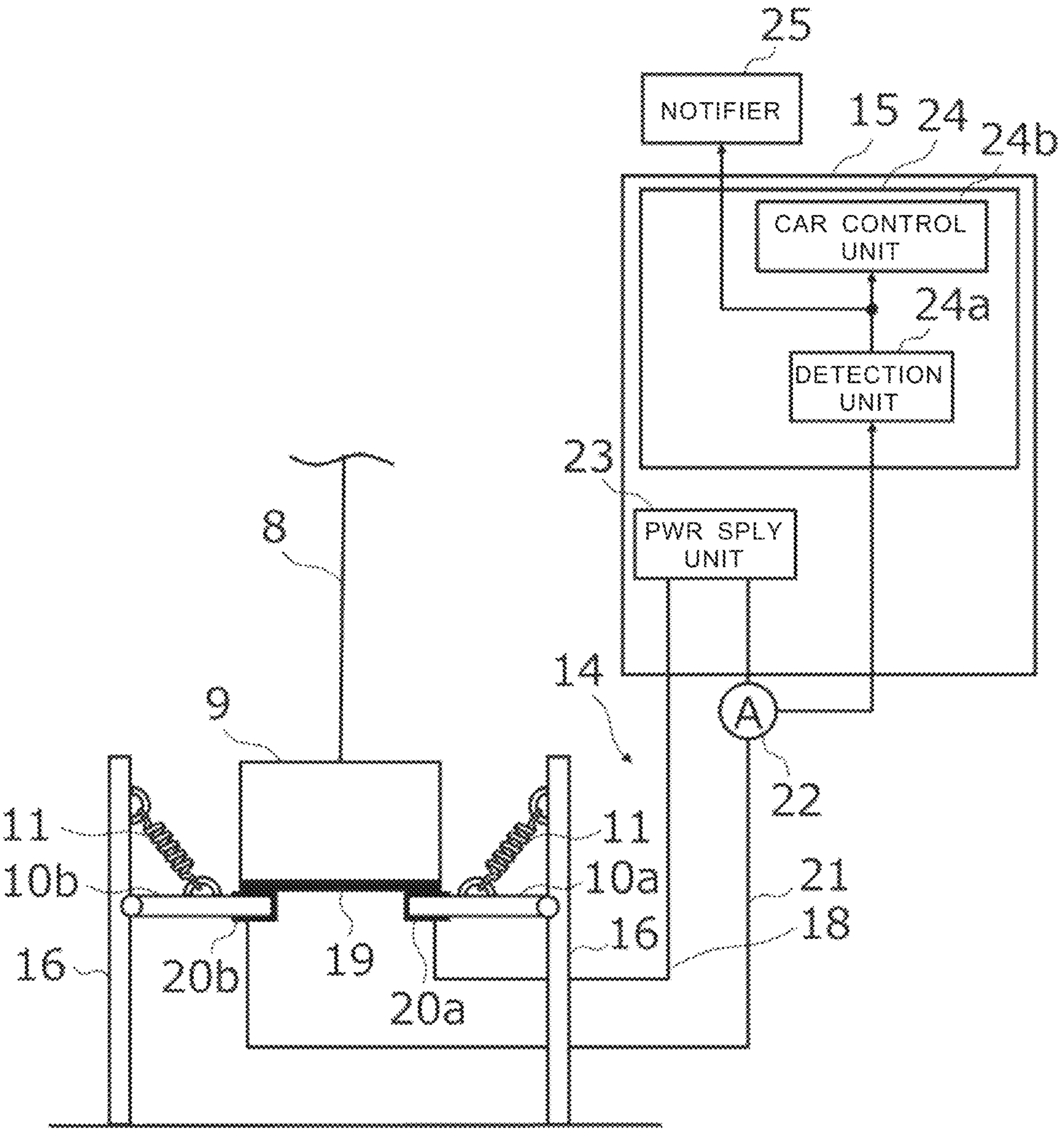
FIG. 7 is a configuration diagram of the elevating body derailment detection device according to a second embodiment.

As illustrated in FIG. 7, the elevating body derailment detection device in the present embodiment does not include the switch 12.

The detection unit 24*a* includes a software module that detects that the counter weight 3*b* is disengaged from the counter weight guide rails 4*b* or there has occurred breakage in the wire 8, on the basis of the current non-detection signal obtained from the ammeter 22. The detection unit 24*a* includes a software module that outputs an operation pause control command to the car control unit 24*b* on the basis of the above-described detection. The detection unit 24*a* further includes a software module that outputs an anomaly detection signal to the notifier 25 on the basis of the above-described detection. The anomaly detection signal refers to an electrical signal indicating that the derailment of the counter weight 3*b* or the breakage of the wire 8 has been detected.

Figure 8:
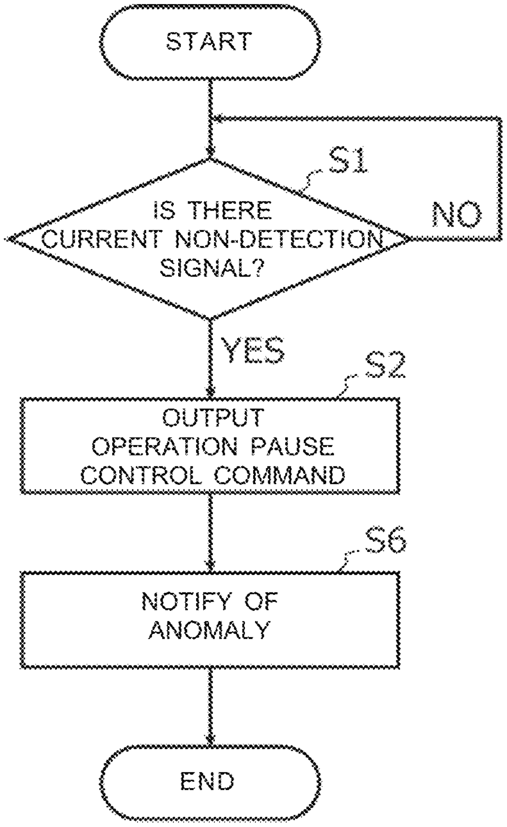
FIG. 8 is a flowchart illustrating control in the control unit of the elevating body derailment detection device according to the second embodiment.

Next, the operation of the present embodiment will be described. FIG. 8 is a flowchart illustrating control in the control unit 24 of the control device 15. Step S6 is a process to be executed instead of steps S3 to S5 in the first embodiment, and therefore the step S6 will be described as follows.

In step S6, when detecting that the counter weight 3*b* is disengaged from the counter weight guide rails 4*b* or that there has occurred breakage in the wire 8, the detection unit 24*a* outputs the anomaly detection signal to the notifier 25. Then, the control unit 24 ends the processing.

As described above, even in the elevating body derailment detection device according to the second embodiment, the wire 8 is pulled by the arm 13 when the counter weight 3*b* is disengaged from the counter weight guide rails 4*b*, and the suspension member 9 is moved upward, thereby causing the first conductive part 19 to be electrically disconnected from the pair of second conductive parts 20 in the detection circuit 14. The detection unit 24*a* detects that the counter weight 3*b* is disengaged from the counter weight guide rails 4*b*, when the first conductive part 19 is electrically disconnected from the pair of second conductive parts 20. This configuration eliminates the need to cause a current to flow in the wire 8 arranged in parallel with the elevating direction of the elevating body 3. Accordingly, it is unnecessary for a maintenance person to carefully perform work so as not to contact the wire 8 while performing work in the hoistway 1, which makes it possible to suppress a decrease in work efficiency of the maintenance person.

Hereinafter, various embodiments of the present disclosure are summarized as appendixes.

APPENDIX 1

An elevating body derailment detection device, comprising:

a wire that is arranged in parallel with an elevating direction of an elevating body that is raised and lowered along a guide rail provided in a hoistway;

a suspension member that is provided at one end of the wire and is provided with a first conductive part;

a detection circuit that has second conductive parts to be electrically connected to the first conductive part, and in which a current flows via the first conductive part;

an arm that is provided to the elevating body, and has a hollow portion through which the wire is to be passed in parallel with the elevating direction, wherein when the elevating body is disengaged from the guide rail, the hollow portion is brought into contact with the wire to move the suspension member so that the first conductive part is electrically disconnected from the second conductive parts; and a detection unit that detects that the elevating body is disengaged from the guide rail, when the first conductive part is electrically disconnected from the second conductive parts.

APPENDIX 2

The elevating body derailment detection device according to appendix 1, further comprising a pair of valves on which the second conductive parts are provided, and that support the suspension member, and is opened by a weight of the suspension member when there has occurred breakage in the wire, which causes the first conductive part to be electrically disconnected from the second conductive parts, wherein the detection unit detects that the elevating body is disengaged from the guide rail or there has occurred breakage in the wire, when the first conductive part is electrically disconnected from the second conductive parts.

APPENDIX 3

The elevating body derailment detection device according to appendix 2, further comprising a sensor that detects that the suspension member has dropped, wherein the detection unit detects that there has occurred breakage in the wire, when the first conductive part is electrically disconnected from the second conductive parts and the sensor detects that the suspension member has dropped, and detects that the elevating body is disengaged from the guide rail, when the first conductive part is electrically disconnected from the second conductive parts and the sensor does not detect that the suspension member has dropped.

APPENDIX 4

The elevating body derailment detection device according to appendix 2 or 3, wherein the second conductive parts provided on the pair of valves are brought into contact with the first conductive part provided on the suspension member, to be electrically connected to the first conductive part, and the elevating body derailment detection device further comprises elastic members that urge the pair of valves so that the second conductive parts are brought into contact with the first conductive part.

An elevating body derailment detection device according to the present disclosure makes it possible to suppress a decrease in work efficiency of a maintenance person.

Obviously many modifications and variations of the present disclosure are possible in the light of the above teachings. It is therefore to be understood that within the scope of the appended claims the disclosure may be practiced otherwise than as specifically described.

What is claimed is:

1. An elevating body derailment detection device, comprising:

a wire that is arranged in parallel with an elevating direction of an elevating body that is raised and lowered along a guide rail provided in a hoistway;

a suspended weight that is provided at one end of the wire and is provided with a first conductive body;

a detection circuit that has second conductive bodies to be electrically connected to the first conductive body, and in which a current flows via the first conductive body;

an arm that is provided to the elevating body, and has a hollow portion through which the wire is to be passed in parallel with the elevating direction, wherein in response to the elevating body being disengaged from the guide rail, the hollow portion is brought into contact with the wire to move the suspended weight so that the first conductive body is electrically disconnected from the second conductive bodies; and processing circuitry to detect that the elevating body is disengaged from the guide rail, in response to the first conductive body being electrically disconnected from the second conductive bodies.

2. The elevating body derailment detection device according to claim 1, further comprising a pair of valves on which the second conductive bodies are provided, and that support the suspended weight, and is opened by a weight of the suspended weight when there has occurred breakage in the wire, which causes the first conductive body to be electrically disconnected from the second conductive bodies, wherein the processing circuitry detects that the elevating body is disengaged from the guide rail, when the first conductive body is electrically disconnected from the second conductive bodies.

3. The elevating body derailment detection device according to claim 2, further comprising a sensor that detects that the suspended weight has dropped, wherein the processing circuitry detects that there has occurred breakage in the wire, when the first conductive body is electrically disconnected from the second conductive bodies and the sensor detects that the suspended weight has dropped, and detects that the elevating body is disengaged from the guide rail, when the first conductive body is electrically disconnected from the second conductive bodies and the sensor does not detect that the suspended weight has dropped.

4. The elevating body derailment detection device according to claim 2, wherein the second conductive bodies provided on the pair of valves are brought into contact with the first conductive body provided on the suspended weight, to be electrically connected to the first conductive body, and the elevating body derailment detection device further comprises elastic bodies that urge the pair of valves so that the second conductive bodies are brought into contact with the first conductive body.

5. The elevating body derailment detection device according to claim 3, wherein the second conductive bodies provided on the pair of valves are brought into contact with the first conductive body provided on the suspended weight, to be electrically connected to the first conductive body, and the elevating body derailment detection device further comprises elastic bodies that urge the pair of valves so that the second conductive bodies are brought into contact with the first conductive body.

* * * * *